United States Patent
Gianordoli et al.

(10) Patent No.: US 8,644,707 B2
(45) Date of Patent: Feb. 4, 2014

(54) BIDIRECTIONAL OPTICAL AMPLIFIER ARRANGEMENT

(75) Inventors: Stefan Gianordoli, Fürstenfeld (AT); Lutz Rapp, Deisenhofen (DE); Michael Rasztovits-Wiech, Vienna (AT); Andreas Stadler, Vienna (AT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1169 days.

(21) Appl. No.: 12/281,939

(22) PCT Filed: Feb. 19, 2007

(86) PCT No.: PCT/EP2007/051563
§ 371 (c)(1),
(2), (4) Date: Sep. 5, 2008

(87) PCT Pub. No.: WO2007/101779
PCT Pub. Date: Sep. 13, 2007

(65) Prior Publication Data
US 2009/0028562 A1 Jan. 29, 2009

(30) Foreign Application Priority Data
Mar. 6, 2006 (DE) .......................... 10 2006 010 147

(51) Int. Cl.
*H04J 14/00* (2006.01)
(52) U.S. Cl.
USPC .................. 398/67; 398/66; 398/71; 398/72; 398/173; 359/341.2
(58) Field of Classification Search
USPC ................ 398/66, 67, 71, 72, 173; 359/341.2
See application file for complete search history.

(56) References Cited

U.S. PATENT DOCUMENTS

| 5,337,175 A | * | 8/1994 | Ohnsorge et al. | ........... 398/72 |
| 6,101,016 A | | 8/2000 | Roberts et al. | |

(Continued)

FOREIGN PATENT DOCUMENTS

| DE | 4104084 A1 | 8/1992 |
| EP | 1231729 A2 | 8/2002 |

(Continued)

OTHER PUBLICATIONS

"ATM SuperPON Capacity Dimensioning" in $3^{rd}$ International Workshop on Community Networking, Proceedings. May 23-24, 1996, p. 61-64 Emmanuel Jaunart et al.

*Primary Examiner* — Tod T Van Roy
(74) *Attorney, Agent, or Firm* — Laurence A. Greenberg; Werner H. Stemer; Ralph E. Locher

(57) ABSTRACT

The invention relates to a bidirectional optical amplifier array (VA) which is preferably used in a passive optical network (PON) system, is disposed between a first line termination (OLT) and a second line termination (ONU), and is penetrated by an optical downstream signal (OSD) in one direction and an optical upstream signal (OSD) in the opposite direction. Said optical amplifier array is composed of a first part with two branching and combining units (D1 and D2), a unidirectional optical amplifier (E1), and a transponder (T) in which the optical downstream signals and upstream signals (OSU and OSD) are separately amplified. The two signals (OSU and OSD) that run in opposite directions are amplified in a bidirectional amplifier (E2) in a second part. A constant gain is maintained in the bidirectional optical amplifier (E2) by means of the continuous downstream signal (OSD) such that the amplifier can be operated in stable conditions for the upstream signal (OSU) regardless of occurring bursts. In another embodiment, a splitter (S1) is integrated into the inventive amplifier array (VA).

14 Claims, 5 Drawing Sheets

(56) References Cited

U.S. PATENT DOCUMENTS

Figure 1:
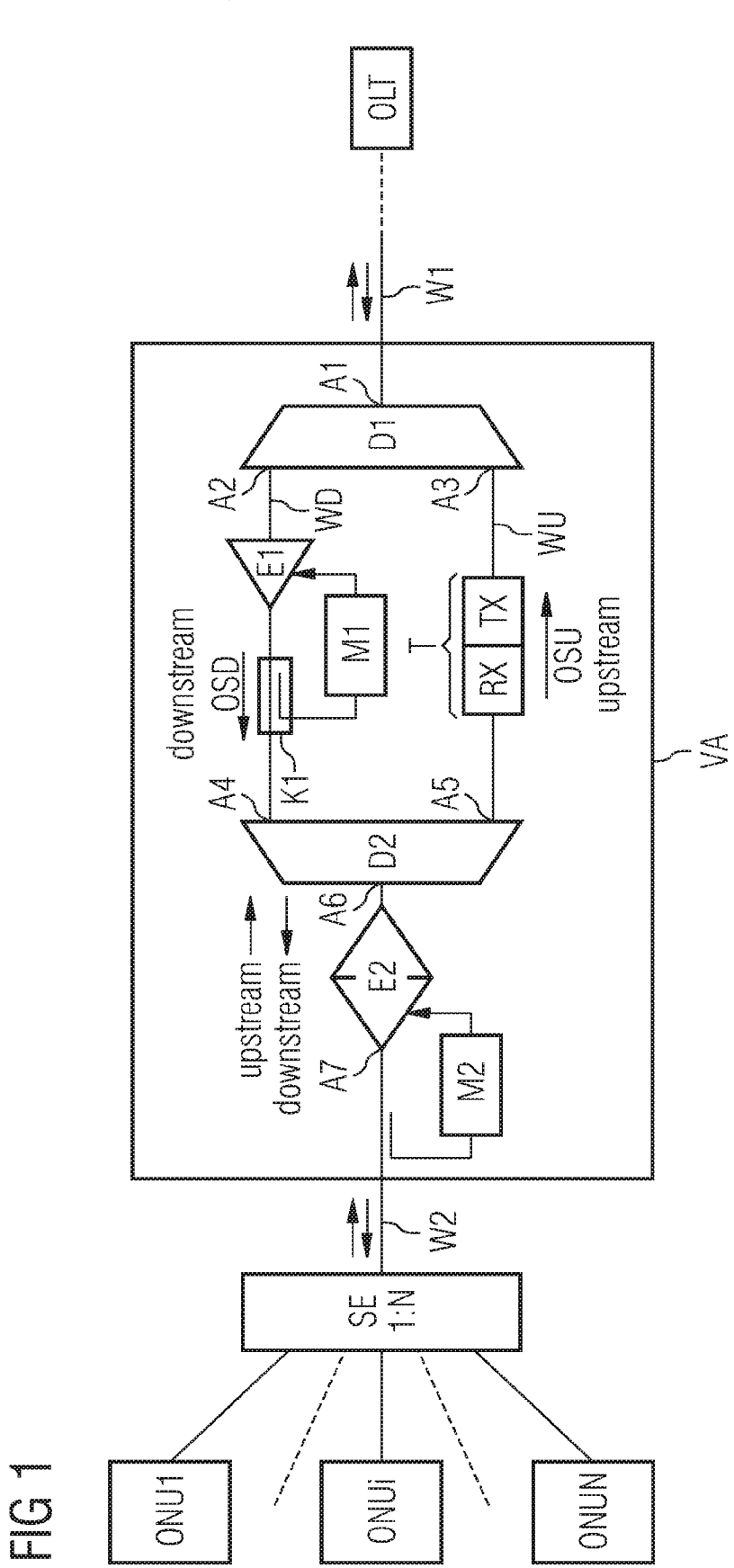

| | | | |
|---|---|---|---|
| 6,236,499 B1 * | 5/2001 | Berg et al. | 359/341.2 |
| 7,231,148 B2 * | 6/2007 | Kinoshita et al. | 398/83 |
| 7,362,972 B2 * | 4/2008 | Yavor et al. | 398/30 |
| 2004/0228632 A1 | 11/2004 | Maeda et al. | |

FOREIGN PATENT DOCUMENTS

| | | |
|---|---|---|
| JP | 2000068944 A | 3/2000 |
| JP | 2006060728 A | 3/2006 |
| WO | WO-95/15625 | 6/1995 |

* cited by examiner

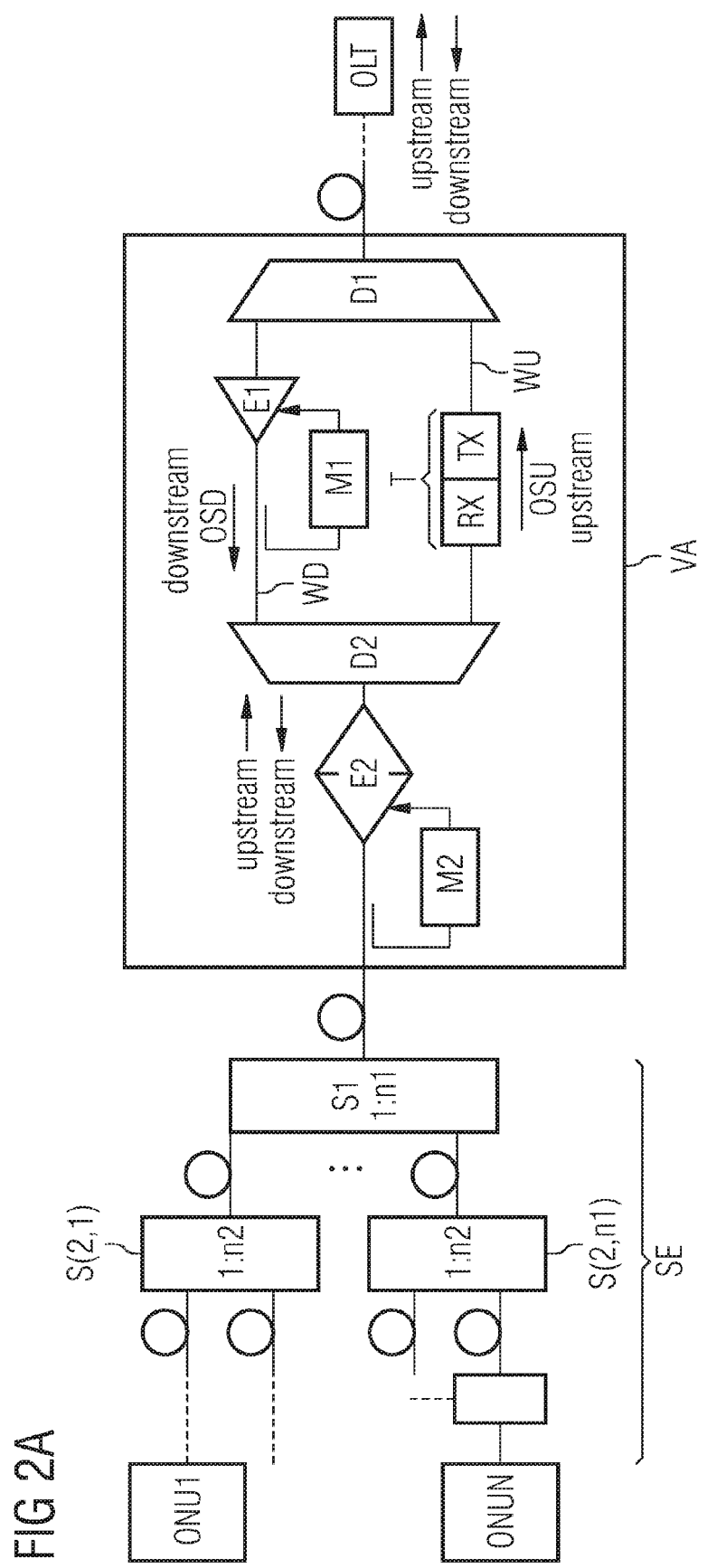

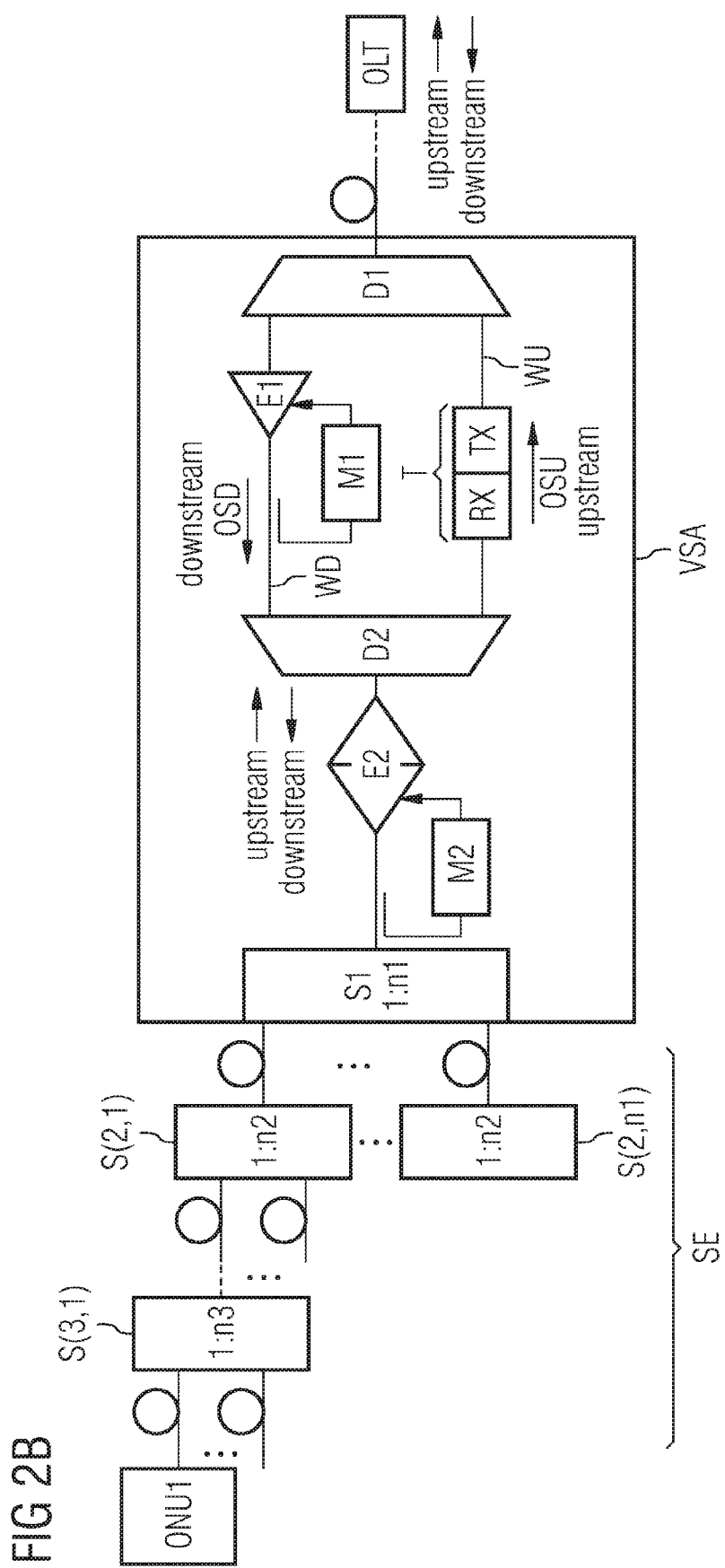

BIDIRECTIONAL OPTICAL AMPLIFIER ARRANGEMENT

CLAIM FOR PRIORITY

This application is a national stage application of PCT/EP2007/051563, filed Feb. 19, 2007, which claims the benefit of priority to German Application No. 10 2006 010 147.2, filed Mar. 6, 2006, the contents of which hereby incorporated by reference.

TECHNICAL FIELD OF THE INVENTION

The invention relates to a bidirectional optical amplifier arrangement, and to an optical transmission system.

BACKGROUND OF THE INVENTION

A distinction is drawn in optical networks between trunk networks, the so-called "core networks" and access networks. The access networks may be designed to be purely passive and are in this case referred to as passive optical networks (PONs). A PON has the characteristic that a central switching and management unit ("optical line termination", OLT for short) transmits/receives data to/from a plurality of subscribers. At the subscriber end, a distinction is drawn between optical network terminations (ONT) as the output point for further subscriber-end networks, or optical network terminals (ONU), although this is not relevant in the context of the present invention. Only the term network terminal ONU will still be used in the following text. The connection between the network terminations OLT and the network terminals ONUs is made via at least one optical power splitter or star coupler with the splitting ratio 1:N (N=the number of subscribers). The data accordingly flows in a PON in both directions between the network termination of the higher-level network or the trunk section, and the numerous optical network terminations at the subscriber end.

The signal flow from the OLT unit to the optical network terminals ONUs is referred to as the downstream. The transmission direction from subscriber end ONU to the OLT is referred to as the upstream. Both upstream signals and downstream signals are generally transmitted on a single glass fiber, and this is referred to as the duplex mode.

Different wavelengths are used for this purpose. In the downstream direction, the transmission takes place in a first end "wavelength channel" using the time-division multiplexing broadcast mode, as a continuous data stream. In the upstream direction, the transmission takes place in bursts in a second wavelength channel, using the time-division multiplexing mode. Specific transmission protocols are used to negotiate when an ONU may transmit. The range is currently typically at most 20 km, the splitting factor is at most 1:64, and the data rate is at most 2.5 Gbit/s.

The further development of these systems for higher data rates is defined in various Standards (for example, BPON, EPON, GPON). The latest developments of PONs for data rates of 10 Gbit/s with overall ranges of 100 km and up to 1024 or even 2048 subscribers is referred to as SuperPON. An overview of the current development status of SuperPON is provided in the article "SuperPON—Ein PON der nächsten Generation" [SuperPON—a PON of the next generation], by A. Stadler, M. Rasztovits-Wiech and S. Gianordoli, which appeared in the ITG Specialist Report Volume 189, VDE Verlag, pages 57-62. The high splitting factor considerably increases the attenuation losses of the optical signal in both directions. Attenuations of about 3-3.5 dB can be expected approximately, even with a splitting factor of 1:2. With an overall splitting ratio of 1:512, which corresponds to nine splitting steps, maximum attenuations of 31.5 dB are achieved. If the path loss is also included with this, being about 7 dB, the attenuation losses are correspondingly added. The higher data rate furthermore requires a higher reception power in the optical receivers.

Since the transmission power of the transmitters cannot be increased any further and very high losses must be overcome because of the high splitting factor, the optical signals must be amplified in both directions along the path. This is most easily done by means of an erbium-doped fiber amplifier (EDFA).

EDFAs are normally designed for unidirectional amplification, although they can also be operated bidirectionally. There are various solutions in the literature for the use of EDFAs to provide a bidirectional amplifier. International Patent Application WO 1995/15625 discloses arrangements composed of EDFAs, WDM couplers and optical isolators which ensure bidirectional amplification for optical signals which are propagating in two wavelength channels and in opposite directions. In a first exemplary embodiment, the signals are separated from one another spatially by means of a first coupler, are individually amplified by means of an EDFA in their respective propagation direction, and are then combined again by means of a second coupler. In a further exemplary embodiment, the optical signals are amplified in both directions, in a single amplification fiber. American Patent Application US2004/0228632 also discloses a bidirectional optical amplifier arrangement in which the amplification is carried out for two signals in opposite directions, in one amplification fiber. Two duplex filters are arranged within the WDM system and are used for combination or for separation of the signals at the transmission or reception end. The filters each have two connections at the transmitter and receiver ends. At the other ends, the filters each have a common connection for the signals in the opposite direction, via which the filters are connected via a filter which is doped with erbium.

In addition to the basic amplifier design, more stringent requirements exist within the PON systems for the amplifier control for the upstream signals which are transmitted in bursts, because relatively long time gaps, for example of several hundred μs, can occur between individual data bursts, and because the data bursts may have amplitude differences of up to 17 dB. The characteristic saturation and recovery time constants of EDFAs are likewise in the range between 100 μs and 10 ms, so that power fluctuations of the input signal lead to transient processes in the output signal of the EDFA. Gain control systems are normally used to set a constant gain, in order to keep the inversion within the doping element erbium at a predetermined nominal level. If no signal is applied to the amplifier, gain control is in principle impossible, since there is no reference signal at the input of the amplifier. When signal power is now applied again to the EDFA input as a result of the arrival of a data burst, then the pump power is initially not optimally set in order to maintain a constant gain. A time period has to pass before the nominal value of the gain and output power are reached. This major dependency of the amplifier dynamic response on the input power is intended to be suppressed for the amplification of the burst-like upstream data signals.

A search is therefore being carried out for simple solutions for an optical amplifier arrangement, in order to achieve amplification which is as optimum as possible for the continuous downstream signal and the upstream signal, which is in the form of bursts.

SUMMARY OF THE INVENTION

The bidirectional optical amplifier according to one embodiment of the invention is an arrangement which offers the advantage of constant gain in particular for the upstream signal, which is in the form of bursts. According to the invention, the downstream signal is used in order to set stable amplifier operation and constant inversion in the amplifier medium independently of the occurrence of bursts. By way of example, this saves the need for a further filling laser, which would be required in order to keep the inversion constant. The upstream signal, which is amplified in a constant form in this way, can if required be amplified again by means of the downstream transponder. The downstream signal is advantageously amplified in two stages. The noise factor is optimized in the first unidirectional amplifier step, and the output power is selected to be as high as possible in the second. In principle, two pump lasers (one for the unidirectional amplifier and a second for the bidirectional amplifier) are advantageously required for the entire amplifier arrangement. This means a considerable cost saving in comparison to an arrangement in which, for example, a filling laser would also feed in, in addition to the EDFA pump lasers.

Fiber amplifiers doped with erbium ions are advantageously used as optical amplifiers within the amplifier arrangement according to the invention, because they can be integrated most easily in the optical network. The use of both unidirectional and bidirectional EDFAs as parts of the amplifier arrangement according to the invention represents a cost-effective and extremely effective implementation variant.

In one advantageous embodiment to the invention, the downstream signal is amplified in an EDFA which is operated bidirectionally, and the upstream signal is amplified in both directions in one amplification fiber.

In a further advantageous embodiment, the upstream signal is amplified again, is possibly formed, and is converted to a different wavelength channel by the use of a regenerator. The wavelength conversion is particularly advantageous when the bidirectional amplifier arrangement is connected to a metro network which is operated using the wavelength-division multiplexing mode. This makes it possible to increase the network capacities.

In one embodiment of the invention, the EDFAs are controlled such that the first unidirectional amplifier has a low noise factor with a constant output power in the downstream direction, and the bidirectional amplifier has a constant and sufficiently high output power for the downstream signal. Optimum operation can be achieved by the amplifier control systems.

If a first splitter device with a relatively low splitting ratio of, for example, 1:8 is already integrated in a fixed form in the amplifier design at the subscriber end, reflections and scatter effects from the downstream fiber network are attenuated. This allows a higher gain to be chosen for the bidirectional amplifier. The power in the direction of the subscribers is also attenuated, so that no laser switch-off mechanisms are required for safety reasons. The higher the quality that is chosen for this first splitter, the less stringent are the tolerance requirements for subsequent splitters. Since the next network part in the downstream direction is designed to be purely passive, the maintenance costs incurred are low, and cost advantages are exploited.

If the first branching and combination unit at the central switching unit end is replaced by an optical add/drop multiplexer, this results in the advantage that the downstream signal can be taken from a metro core network, and the upstream signal can be added to the metro core network. Connection to a metro core network, which is preferably designed to use the wavelength-division multiplexing mode, results in more effective utilization of the network, and considerable amounts of data can be transported on a plurality of access connections.

BRIEF DESCRIPTION OF THE INVENTION

Exemplary embodiments of the invention will be explained in more detail with reference to figures, in which FIG. 1 shows an outline circuit diagram of the bidirectional optical amplifier arrangement.

FIGS. 2a, b show two embodiment variants of the connecting devices at the subscriber end.

Figure 3A:
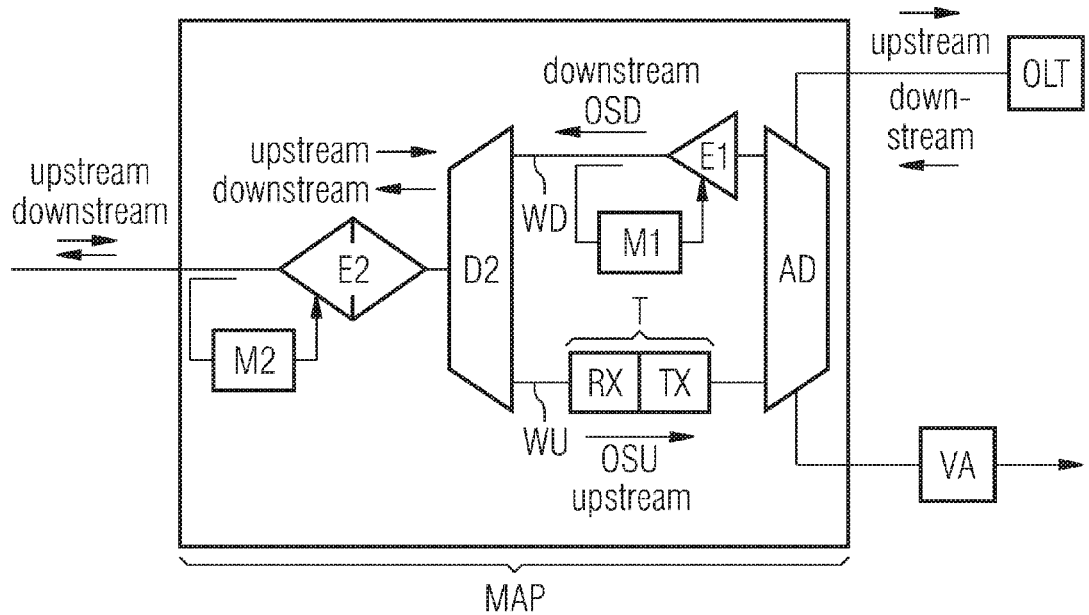

FIGS. 3a, b show two embodiment variants of the connecting devices at the central switching device OLT end with a metro network.

Figure 4:
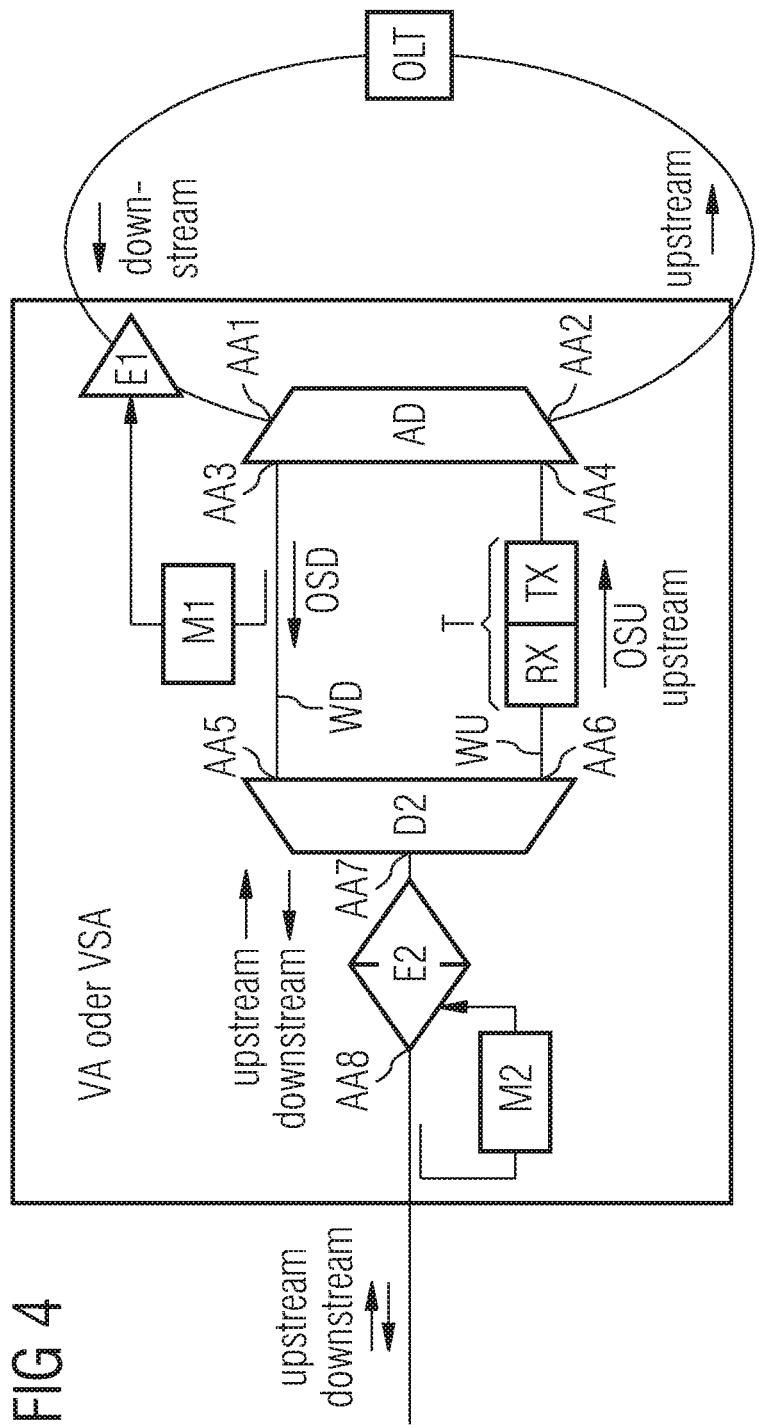

FIG. 4 shows an embodiment variant of the bidirectional optical amplifier arrangement with an optical amplifier in the connected metro network.

DETAILED DESCRIPTION OF THE INVENTION

As illustrated in FIG. 1, the bidirectional optical amplifier arrangement VA according to the invention in principle comprises two parts. The optical downstream and upstream signals are amplified separately from one another in a first part, comprising two branching and combination units D1 and D2, a unidirectional optical amplifier E1 and a transponder T. The two signals in opposite directions are amplified in a bidirectional amplifier E2 in a second part.

The optical amplifier arrangement according to the invention has been created against the background of the implementation of a SuperPON system, in which data rates of up to 10 Gbit/s are transmitted in the downstream direction, with a mean channel power of 1 mW. Data rates of up to 2.5 Gbit/s are provided in the upstream direction, with a mean channel power of 4 mW. Considered in the downstream direction, a bidirectional connection W1, for example a glass fiber, leads from the first network termination OLT end to a first branching and combination unit D1. By way of example, this is an optical duplex filter in which the optical downstream signal OSD is separated from the optical upstream signal OSU. Two connections WD and WU lead from this duplex filter D1 via the connections A2 and A3 to the connections A4 and A5 of a second branching and combination unit D2, which is likewise a filter or a multiplexer unit and in which the upstream and downstream signals are separated from one another or combined.

A unidirectional optical amplifier E1 is arranged in the connecting path WD for the downstream signal OSD. An EDFA is preferably used as an amplifier. Downstream from the amplifier E1, a portion of the amplified downstream signal is output via a coupler K1, and is supplied to a power monitor M1. The gain of E1 is controlled with the aid of the power monitor M1 such that the output power from E1 reaches a constant value. Furthermore, the amplifier is designed so as to achieve a good noise factor. The optical amplifier may be pumped codirectionally or contradirectionally by means of one or more laser sources. The pump source is not illustrated in FIG. 1. Conventional single-stage or multi-stage EDFA accessories are used as amplifier accessories, depending on the requirements and constraints. Furthermore, isolators may be used along the connection WD or within the amplifier E1. It is likewise feasible to use wavelength filters in the path WD. Alternatively, the pass band of the duplex filter can be chosen such that it likewise acts as a suitable wavelength filter.

After passing through the amplifier D1, the downstream signal OSD is combined with the upstream signal OSU via the optical duplex filter D2, and is supplied to the bidirectional optical amplifier E2. E2 is also preferably in the form of an EDFA. The gain of EDFA E2 is set with the aid of the power monitor M2 such that the output power of E2 reaches a constant and sufficiently high value in the downstream direction. In this case, it must be remembered that the output power of EDFA E1 is set such that the gain of E2 is nevertheless sufficiently low in order neither to satisfy an oscillation condition for E2 nor to cause noticeable signal distortion. The control of the output powers of E1 and E2 results in a constant gain for the amplifier E2. A gain value of about 20 dB should not be exceeded for the amplifier E2. The output power of EDFA E1 is also set such that the input power of E2 is considerably greater in the downstream direction than in the upstream direction. This ensures that the upstream signal, which is in the form of bursts, is subject to a constant gain, and that the downstream signal is not interfered with by interactions with the upstream signal in the EDFA E2. The downstream signal accordingly ensures constant inversion of the amplifier E2, and a constant operating point is set. The EDFA E2 is preferably pumped in the upstream direction, because this results in a better noise factor in the upstream direction.

Depending on the data rate, means for dispersion compensation, such as gratings or dispersion-compensated fibers, may be used in both signal directions within the bidirectional amplifier arrangement VA. An arrangement of a dispersion-compensating fiber within the path WD or within the amplifier E2 is feasible, in particular in the downstream direction, because of the higher data rate.

In the upstream direction, the upstream signals, which are in the form of bursts and come from the individual subscribers ONU1, ONU2 to ONUN, of a splitter device SE (splitting ratio 1:N) are combined to form an overall upstream signal OSU. The upstream signal OSU is amplified in the EDFA E2, and is then separated from the downstream signal OSD in the duplexer D2. A suitable regenerator, RxTx, for example a burst-compatible transponder T, is arranged in the connecting path WU to the next duplexer D1. The optical signal received in the transponder has two "logic states", which correspond to logic 1 or 0, and a third state between the data bursts, in which all the transmission lasers of the ONUs are switched off. In one embodiment variant, these "three-stepped" optical data bursts are converted in an opto-electrical transducer to electrical data bursts, and are supplied to a limit-amplifier or to a threshold value circuit. There, they are converted to binary data bursts, and are then converted from electrical to optical form. The lasers which are used for electro-optical conversion in the transponder can in this embodiment variant always remain switched on and can send a continuous signal at a uniform amplitude. In this way, despite an input signal whose amplitude varies severely, the transponder produces an output signal whose amplitude is approximately constant. In addition, when relatively long reception pauses occur, the regenerator sends a filling signal (for example "0-1" sequence). 3R regeneration in the transponder is not absolutely essential. Conversion of the wavelength of the upstream signal OSU within the transponder is advantageous if the upstream signal is then supplied to a WDM network. The overall upstream signal which has been regenerated in this way then has the downstream signal removed from it in the duplexer D1.

The bidirectional optical amplifier arrangement VA is arranged in a PON network between the first network termination of the central switching unit OLT and a splitter device SE. The splitter device SE is connected to the individual network terminals ONU1, ONU2, ... ONUN of the N subscribers, which form the second network termination. In general, the splitter device SE is an arrangement which comprises a plurality of individual splitters or star couplers connected in series. This is illustrated in FIG. 2a. At the subscriber end, further splitters S(2, 1) to S(2, n1) are each connected via their own dedicated glass fiber to each output of a first splitter S1 with the splitting factor 1:n1. The overall splitting factor 1:N is in this case split such that N=n1*n2* ... *ni. The access connections between the first coupler and the subscriber connections ONUs are designed to be purely passive and require no maintenance. The same wavelengths are used for the same services on all the access connections downstream from the amplifier arrangement VA according to the invention (but separate wavelengths are used for upstream and downstream signals), so that standard network terminals ONUs can be used.

The distance between the network terminals ONUs and the optical amplifier arrangement VA is normally up to 30 km. In FIGS. 2a and 2b, this path length is distributed over the optical path lengths between the splitters, as is indicated by the numerous fiber loops. In this case, even greater distances of several km can be covered between the individual splitters.

In a further embodiment variant, the first splitter S1 is integrated in the amplifier arrangement VA at the subscriber end. FIG. 2b shows a block diagram of an amplifier and splitter arrangement VSA such as this. In this case, the first splitter S1 is arranged connected directly to the amplifier E2 at the subscriber end. A lower splitting ratio, for example of 1:8, is chosen for the splitter S1. Further splitters are arranged along the path to the network terminals ONUs, over the path length of 30 km as mentioned above. The installation of the first splitter S1 in the amplifier arrangement VA offers numerous advantages for transmission systems.

a) Reflections and Rayleigh scatter are attenuated by the splitter S1. As a consequence, the gain of E2 can also be chosen to be higher than the normal limit of 20 dB.

b) The suppression of the stimulated Brillouin scatter for the downstream signal is simplified or avoided.

c) Other non-linear distortion for the downstream signal is also reduced.

d) The optical power at the output of the SVE in the downstream direction is less, and in some circumstances even corresponds to Laser Class 1. No laser switching-off mechanisms are therefore required at the subscriber end.

e) If a very high quality splitter S1 is chosen with uniform attenuation, then the requirements for the numerous downstream splitters are less stringent.

Figure 3B:
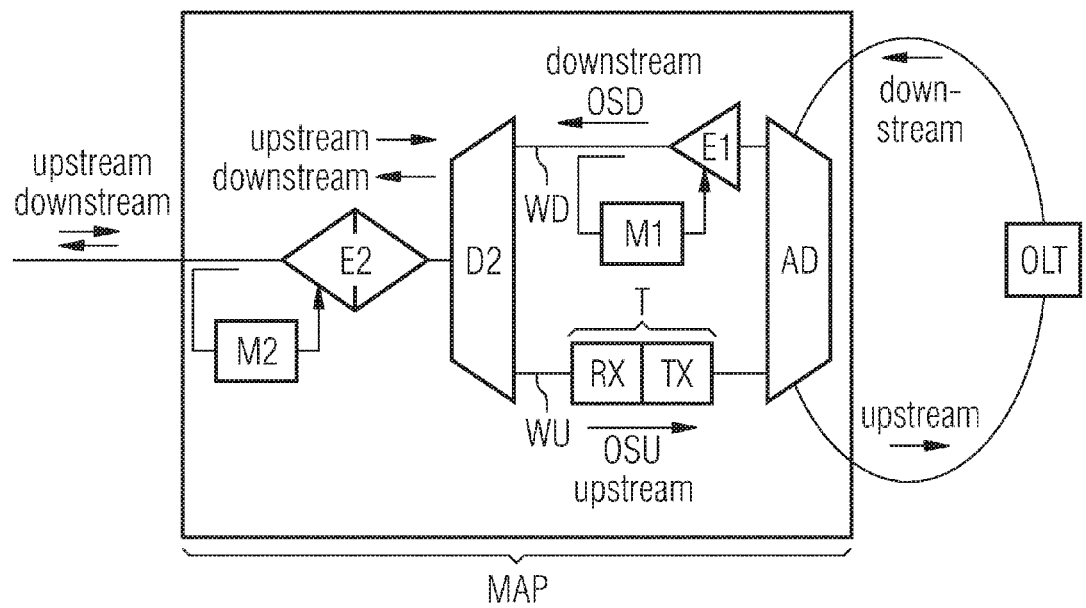

FIG. 3 shows two exemplary embodiments for the connection of the amplifier arrangement VA or VSA according to the invention at the central switching and management unit OLT end. In general, the amplifier arrangement VA or VSA according to the invention is connected on this side to a metro network. In order to obtain access to the metro network an optical add/drop multiplexer AD is used instead of the branching and combination unit D1 of the amplifier arrangement VA or VSA. The amplifier arrangement VA or VSA can in this case be equated with a so-called metro access point (MAP). The MAP represents the interface between the metro network and the access area. Transmission is advantageously carried out using the wavelength-division multiplexing mode in the metro area, so that it is possible to transport the considerable amounts of data of a plurality of access connections. The management and switching center is part of this metro network, and from there also controls the data traffic to the individual MAPs with their connected ONUs. FIG. 3a shows a plurality of VA or VSA, or MAPs, arranged along a bidirectionally operated glass fiber connection. This may either comprise two glass fibers, in which only one wavelength may be operated, or one fiber with different wavelength channels. In FIG. 3b, the MAP is connected to a unidirectional WDM glass fiber ring. Furthermore, amplifier arrangements VA or VSA or MAPs can be arranged along the glass fiber ring.

FIG. 4 shows a further embodiment variant of the amplifier arrangement VA or VSA according to the invention, when in the form of a metro access point MAP. In this case, the optical amplifier E1 from the connecting path WD is arranged upstream of the add/drop multiplexer AD in the downstream direction within the metro ring network. In this case, E1 is used as an in-line amplifier for the signals which occur at this point. The signals which are present are different since a downstream signal is tapped off, and an upstream signal is added to the metro network, in each MAP. A portion of the signal OSD is tapped off along the connecting path WD for the downstream signal and is supplied to a power monitor M1, which controls the amplifier E1. The advantage of this embodiment variant is that E1 can be used to compensate for the insertion loss of the add/drop multiplexer AD and for the fiber attenuation between the individual MAPs. This makes it possible not only to increase the number of MAPs in the network, but also to increase the range for signal transmission within the network.

The invention claimed is:

1. A bidirectional optical amplifier arrangement arranged between a first network termination and a second network termination and passed through in one direction by an optical downstream signal and in an opposite direction by an optical upstream signal, comprising:
   a first branching and combination unit arranged at the first network termination end, wherein
   the first branching and combination unit has at least one common connection for both signals at the first network termination end, and an output for the downstream signal and an input for the upstream signal at the second network termination end,
   the output for the downstream signal is connected via a unidirectional optical amplifier to an input for the downstream signal from a second branching and combination unit;
   an output for the upstream signal from the second branching and combination unit is connected via a transponder to the input for the upstream signal of the first branching and combination unit,
   the second branching and combination unit has a common connection for both signals at the second network termination end, which connection is connected to a bidirectional optical amplifier, from which a common connections for both signals leads to the second network termination;
   a power monitoring device for controlling a gain of the unidirectional optical amplifier;
   a power monitoring device for controlling a gain of the bidirectional optical amplifier;
   the optical amplifiers are controlled such that, in the downstream direction, the unidirectional optical amplifier has a low noise factor, and the bidirectional optical amplifier has a constant and high output power; and
   the output power of the unidirectional optical amplifier is set such that the gain of the bidirectional optical amplifier is sufficiently low in order neither to satisfy an oscillation condition for the bidirectional optical amplifier nor to cause noticeable signal distortion and that the input power of the bidirectional optical amplifier is considerably greater in the downstream direction than in the upstream direction.

2. The bidirectional optical amplifier arrangement as claimed in claim 1, wherein the unidirectional optical amplifier and the bidirectional optical amplifier are formed as fiber amplifiers, whose amplification fibers are doped with rare earth elements.

3. The bidirectional optical amplifier arrangement as claimed in claim 2, wherein the bidirectional optical amplifier is designed such that the downstream signal and the upstream signal are amplified in both directions in a common amplification fiber.

4. The bidirectional optical amplifier arrangement as claimed in claim 1, wherein the transponder for the upstream signal includes a data regenerator and/or wavelength converter.

5. The bidirectional optical amplifier arrangement as claimed in claim 1, wherein the transponder is designed such that it emits a binary upstream signal.

6. The bidirectional optical amplifier arrangement as claimed in claim 1, further comprising an optical splitter connected directly to the bidirectional optical amplifier at the second network termination end.

7. The bidirectional optical amplifier arrangement as claimed in claim 1, wherein the first branching and combination unit at the first network termination end is formed of an optical add/drop device which has at least two connections at the first network termination end, such that the downstream signal is taken from a metro core network, and the upstream signal is added to the metro core network.

8. An optical transmission system, comprising:
   a central switching device which is connected to a higher-level optical transmission network and is connected via an optical splitter device to a plurality of optical network terminals in which an optical downstream signal is transmitted in the downstream direction from the central switching device to the optical network terminals using the time-division multiplexing mode;
   an optical upstream signal transmitted in bursts in the upstream direction from the optical network terminals to the central switching device; and
   the bidirectional optical amplifier arrangement according to claim 1 arranged between the central switching device and the optical splitter device.

9. The optical transmission system as claimed in claim 8, further comprising a first optical splitter which splits the downstream signal in a first ratio and combines the upstream signal in a corresponding manner and is connected to the bidirectional optical amplifier, as a component of the bidirectional optical amplifier arrangement at the network terminal end.

10. The optical transmission system as claimed in claim 9, wherein the splitter device is designed such that a sequence of further splitters is connected to the outputs of the first splitter.

11. The optical transmission system as claimed in claim 8, wherein the optical connections between the first splitter device and the optical network terminals are free of active optical elements.

12. The optical transmission system as claimed in claim 8, wherein the higher-level optical transmission network is operated in the wavelength-division multiplexing mode.

13. The optical transmission system as claimed in claim 12, wherein the bidirectional optical amplifier arrangement is provided as a wavelength-selective metro connecting device.

14. A bidirectional optical amplifier arrangement arranged between a first network termination and a second network termination and passed through in one direction by an optical downstream signal and in an opposite direction by an optical upstream signal, comprising:

the first network termination arranged in a metro ring network, such that the downstream signal is supplied from the first network termination to a first connection of an add/drop device;

a unidirectional optical amplifier for the downstream signal is connected immediately upstream of the first connection of the add/drop device, the upstream signal is supplied from a second connection of the add/drop device to the first network termination;

the add/drop device has an output for the downstream signal and an input for the upstream signal at the second network termination end, the output for the downstream signal is connected to an input for the downstream signal from a branching and combination unit;

a power monitoring device controlling a gain of the unidirectional optical amplifier connected to a connecting path with its output connected to the unidirectional optical amplifier;

an output for the upstream signal from the branching and combination unit is connected via a transponder to the input for the upstream signal of the add/drop device, and the second branching and combination unit has a common connection for both signals at the second network termination end, which connection is connected to a bidirectional optical amplifier, from which a common connection for both signals leads to the second network termination;

a power monitoring device controlling a gain of the bidirectional optical amplifier;

the optical amplifiers being controlled such that, in the downstream direction, the unidirectional optical amplifier has a low noise factor, and the bidirectional optical amplifier has a constant and high output power; and the output power of the unidirectional optical amplifier is set such that the gain of the bidirectional optical amplifier is sufficiently low in order neither to satisfy an oscillation condition for the bidirectional optical amplifier nor to cause noticeable signal distortion and that the input power of the bidirectional optical amplifier is considerably greater in the downstream direction than in the upstream direction.

* * * * *